United States Patent Office 2,824,125
Patented Feb. 18, 1958

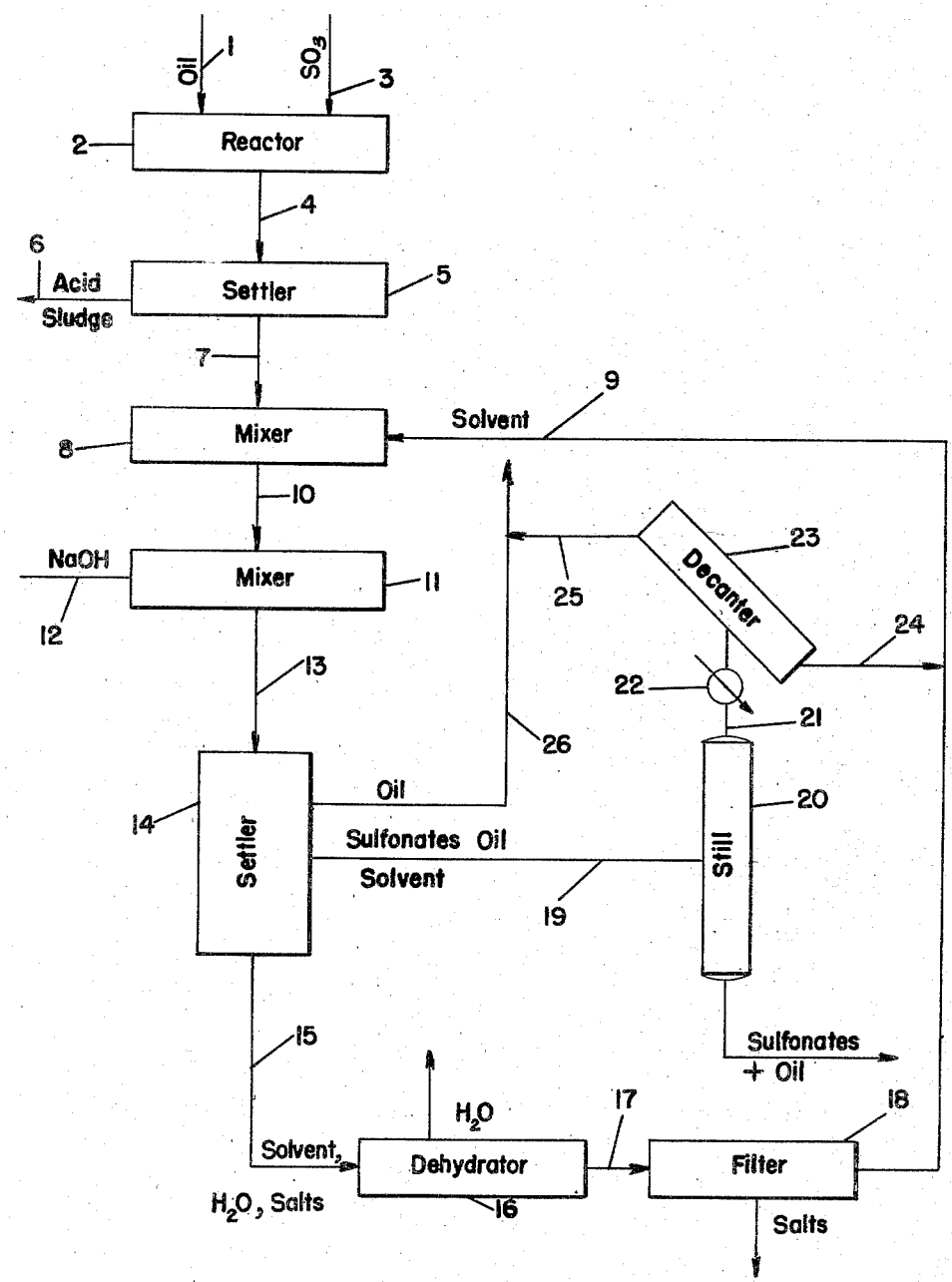

2,824,125

MANUFACTURE OF SULFONATE CONCENTRATE OF LOW SALT CONTENT

Evan E. Davis, Jr., Drexel Hill, Willard K. Parcells, Chester, and George S. Rostron, Springfield, Pa., assignors to Sun Oil Company, Philadelphia, Pa., a corporation of New Jersey Application January 31, 1956, Serial No. 562,416

4 Claims. (Cl. 260—504)

This invention relates to the manufacture of mahogany sulfonates and more particularly to a process for the production of sodium sulfonate concentrates having an inorganic salt content of 0.7% or less.

In the production of mahogany sulfonates, an oil of lubricating viscosity, preferably a solvent-refined naphthenic oil, is contacted with a sulfonating agent such as anhydrous sulfur trioxide, oleum, concentrated sulfuric acid or chlorosulfonic acid. After contacting, the reaction mixture is allowed to settle, and a sour oil containing mahogany sulfonic acids together with dissolved sulfur trioxide, sulfur dioxide and sulfuric acid is separated from acid sludge. This sour oil is then further treated to recover therefrom the desired mahogany sulfonates. In commercial operations, this is usually accomplished by treating the oil with equal volumes of naphtha and an aqueous alcoholic caustic solution in order to recover a sulfonate-free oily layer and an alcoholic solution of mahogany sulfonates which contains a considerable amount of inorganic salts formed by reaction of the caustic with the dissolved inorganic sulfur compounds. The sulfonates may be salted out of this solution by treatment with a concentrated aqueous salt solution, for example as described in United States Patent 2,497,152 to Cohen to produce a purified solution of mahogany sulfonates in alcohol. The heat load in such a process is considerable since it is necessary to distill the naphtha from the oil recovered from the neutralization step for recycle to the process; to recover alcohol by distillation from both the purified sulfonate solution and the aqueous salt solution; and to concentrate the salt solution to fit it for recycle to the salting-out step. In addition, at least two settling tanks must be provided, one after the neutralization step and one after the salting-out step; and at least three fractionating towers are required, one for separation of naphtha, one for recovery of alcohol from the sulfonate solution and one for recovery of alcohol from the aqueous salt solution. This equipment represents a very considerable investment which adds greatly to the cost of the process.

It is an object of this invention to provide a process for the production of low salt content mahogany sulfonates in which both heat load and investment cost are minimized.

We have found that this object may be accomplished by mixing with the sour oil from 50% to 100% by volume of glycerine or ethylene glycol (which will hereinafter be jointly referred to as solvent) and then contacting the mixture with sufficient concentrated caustic soda to neutralize it. The neutralized mixture is then allowed to settle. Upon settling, it will be found to break into three layers; a lower layer consisting of solvent together with substantially all the inorganic salt and water content of the mixture; a middle layer consisting of mahogany sulfonates, a small amount of solvent and oil; and an upper layer consisting of sulfonate-free oil. The lower layer is withdrawn and is heated to a temperature sufficiently high to flash off the water content. After dehydration, the inorganic salts are no longer soluble in the solvent and will precipitate in a form such that they may be readily separated by filtration. The anhydrous, salt-free solvent may then be recycled to the process.

The middle layer, which is essentially salt-free, is passed to a vacuum distillation unit in which solvent and sufficient oil to yield a bottoms containing about 50 to 70% sulfonates are taken overhead. The overhead may be separated by decantation into oil, which is mixed with the upper layer from the settler and passed to storage, and solvent, which is mixed with the solvent recovered from the filtering operation, for recycle to the process. The bottoms from the vacuum distillation consists of a concentrate of mahogany sulfonates in oil, essentially free of inorganic salts. The distillation is preferably controlled so that the bottoms contain about 50 to 70% sulfonates, corresponding to the strength of standard commercial sulfonate concentrates. If, however, oil-free sulfonates are desired, the distillation may be continued until until all the oil has been taken off overhead, or the concentrate may be de-oiled by any other conventional method, such as by dilution with naphtha and extraction with alcohol to yield substantially salt-free sulfonates. Such de-oiling is not, however, either necessary or desirable in the great majority of cases since sulfonates are generally sold as oil concentrates and, in fact, the oil-free sulfonate produced by prior art processes described above is, in many instances, cut back with oil to form a concentrate prior to sale.

The amount of oil which must be distilled to obtain the 50 to 70% concentrate will, of course, depend on the percentage of oil in the middle layer removed from the settler, and this, in turn, is a function of the settling time. We prefer to withdraw the middle layer after about one hour settling time, at which time, the layer contains about 50% oil, 20% solvent and 30% sulfonates. If it is withdrawn earlier, the oil content will be higher, and an unnecessary heat load will be imposed on the process to distill over the extra oil. If withdrawn later so that the layer contains less oil, the solvent may not be completely removed by the time the bottoms has reached the desired concentration, since it is necessary to distill about 30% or so of oil in order to sweep all solvent vapors out of the still. If, however, due to circumstances beyond the operator's control, the middle layer should contain less oil than desired, distillation may be continued until all solvent has been removed and oil may be added to the bottoms to bring the sulfonate concentration to the desired level.

It is important that the solvent introduced to the process should contain as little water as possible, and that the caustic solution used should be concentrated, since if too much water is present, difficulty is encountered with emulsions, and separation of the mixture into layers is difficult and time consuming. It has been found that the presence of even 5% of water in the solvent will more than double the settling time required. Some water is, however, required in order to dissolve the inorganic salts and carry them down into the lower layer of the settler and, for this reason, the use of anhydrous caustic is undesirable. We have found that optimum results are obtained by the use of anhydrous solvent and 50° Baumé caustic.

An essential condition of the invention is that the sour oil not be neutralized before contact with the solvent. If the sour oil is first contacted with caustic, and then contacted with solvent, some salt removal is obtained, but the finished sulfonates will contain up to about 20% of the inorganic salt content of the mixture. Good results may be obtained by first mixing the solvent and caustic solution, and then contacting the sour oil with the mixture, and operation in this manner falls within the scope of the present invention. The best and most reproduceable results are obtained by proceeding as described above, that is, mixing the solvent and sour oil prior to contacting with caustic, and this mode of operation is preferred.

As to the amount of solvent required, we have found that 50 to 100 volume percent based on the oil to be treated is optimum for sour oils generally encountered, which usually contain from about 7½ to about 15 percent sulfonic acids. If less than the optimum quantity of solvent is used, the solvent/water ratio will be too low and emulsion difficulties may be encountered. More than the optimum quantity of solvent may be used, but no better results are obtained, and larger equipment is required for the same throughput. In general, we have found that where the sulfonic acid content of the sour oil is about 7½%, 50 volume percent of solvent is adequate; where the oil contains 10% sulfonic acids, 75 volume percent of solvent is required; and when the sulfonic acid content is 15%, about an equal volume of solvent is needed. This is, of course, because more acid oils require more caustic for neutralization, and the quantity of water introduced into the system with the caustic will be larger.

We have tried a number of oxygenated hydrocarbons as solvents in our new process, but have found that only glycerine or ethylene glycol give satisfactory results. Using solvents such as propylene and butylene glycols, dioxane, Cellosolve, and the like, we found that we were able to break the mixture into three layers, but we found that the sulfonates were appreciably soluble in the solvents, and a considerable quantity of sulfonates appeared in the lower layers and were lost with the inorganic salts upon dehydration of the solvent. Our invention is, therefore, limited as to the solvent component to glycerine and ethylene glycol.

In order that those skilled in the art may more fully appreciate the nature of our invention and the manner of carrying it out, an example will be further described in connection with the accompanying drawing, which is a flow sheet of a process in accordance with the invention.

Solvent refined naphthenic oil of lubricating viscosity is introduced through line 1 to reactor 2, in which it is contacted in a manner well known to those skilled in the art with anhydrous sulfur trioxide introduced through line 3. A mixture of sulfonic acids, unreacted oil and acid sludge is taken from reactor 2 through line 4 to settler 5, in which the mixture breaks into an acid oil layer and an acid sludge layer, which is removed through line 6.

The acid oil layer, which contains about 10% mahogany sulfonic acids together with small amounts of dissolved sulfur trioxide, sulfur dioxide and sulfuric acid, is passed through line 7 to mixer 8, in which it is thoroughly mixed with 75% of its volume of glycerine, introduced through line 9. The mixture is then passed through line 10 to mixer 11 in which it is contacted with a concentrated caustic soda solution introduced through line 12 in an amount required to neutralize the acidic components of the oil, in this case about 8 percent by volume based on the oil of 50° Baumé caustic. The neutralized mixture, which now comprises unreacted oil, sodium sulfonates, inorganic salts, water, and glycerine is taken through line 13 to settler 14, in which it breaks into three layers; the lower layer comprising glycerine, water and inorganic salts; the second layer being composed of 30% sulfonates, 20% glycerine and 50% unreacted oil essentially free of inorganic salts; and the upper layer comprising unreacted oil essentially free of sulfonate, glycerine or salts.

The lower layer is removed from settler 14 via line 15 and is passed to dehydrator 16 in which it is heated to drive off the water content. Elimination of the water causes the salt content to crystallize and precipitate. A slurry of glycerine and salts is taken through line 17 to filter 18 in which the salts are removed, anhydrous salt-free glycerine being recycled to the process through line 9.

The middle layer in settler 14 is taken through line 19 to a vacuum distillation tower 20 in which oil and solvent, in amount of about 50% of the charge to tower 20 are taken overhead through line 21 and condenser 22 to decanter 23, in which they separate into a solvent layer, which is taken off for recycle to the system through line 24, and an oil layer which is taken through line 25 for admixture with the upper layer from settler 14, which has been removed therefrom through line 26. A bottoms product, which is a sulfonate oil concentrate comprising about 65% sodium sulfonates, and which is essentially salt-free, is removed from tower 20 and sent to storage. By "essentially salt-free" we do not mean to convey the impression that the concentrate contains no inorganic salts whatever. What we mean by "essentially salt-free" is that the concentrate comprises a very small quantity of inorganic salts, less than 0.7% by weight.

As may be seen from the foregoing, we have provided a method for producing essentially salt-free sodium sulfonate concentrates which requires far less heat than the prior art process, the only heat required being that necessary to vaporize a minor proportion of the oil and solvent charged to the process and the small amount of water charged. In addition, there is a great saving in equipment cost since only one settler and one distillation tower are required. A further advantage is that a commercial sulfonate concentrate is produced directly in the process, thus eliminating the handling costs inherent in cutting back dry sodium sulfonates with oil.

We claim:

1. A process for the manufacture of essentially salt-free mahogany sulfonate which comprises treating a petroleum fraction of lubricating viscosity with a sulfonating agent, recovering a sour oil containing mahogany sulfonic acids, mixing the sour oil without prior neutralization thereof with at least 50% of its volume of a solvent selected from the group consisting of substantially anhydrous glycerine and ethylene glycol and with sufficient concentrated caustic soda solution to neutralize the acidic components of the sour oil, stratifying the mixture into three immiscible layers and recovering essentially salt-free mahogany sulfonate from the middle layer.

2. A process for the manufacture of essentially salt-free mahogany sulfonates which comprises treating a petroleum fraction of lubricating viscosity with a sulfonating agent, recovering a sour oil containing mahogany sulfonic acids, mixing the sour oil with at least one-half its volume of solvent selected from the group consisting of substantially anhydrous glycerine and ethylene glycol, contacting the mixture with sufficient concentrated caustic soda to neutralize the acidic components of the mixture, stratifying the neutralized mixture into three layers, of which the middle layer comprises mahogany sulfonates, solvent and neutral oil, distilling the middle layer to take overhead solvent and a portion of the neutral oil, and recovering as a bottoms product from the distillation step an essentially inorganic salt-free concentrate of mahogany sulfonates in neutral oil.

3. The process according to claim 2 including separating from the stratification step a lower layer comprising solvent, water and inorganic salts, heating the lower layer to drive off its water content, separating solvent from the inorganic salts and recycling the solvent to the mixing step.

4. The process according to claim 3 including separating the overhead product from the distillation step into an oil phase and a solvent phase, and recycling the solvent to the mixing step.

References Cited in the file of this patent

UNITED STATES PATENTS

| | | |
|---|---|---|
| 1,315,623 | Cobb | Sept. 9, 1919 |
| 1,659,782 | Moran | Feb. 21, 1928 |
| 2,573,796 | Latier et al. | Nov. 6, 1951 |